United States Patent
Li et al.

(10) Patent No.: US 9,928,296 B2
(45) Date of Patent: Mar. 27, 2018

(54) SEARCH LEXICON EXPANSION

(75) Inventors: Xiao Li, Bellevue, WA (US); Jingjing Liu, Cambridge, MA (US); Alejandro Acero, Bellevue, WA (US); Ye-Yi Wang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 725 days.

(21) Appl. No.: 12/970,477

(22) Filed: Dec. 16, 2010

(65) Prior Publication Data

US 2012/0158703 A1      Jun. 21, 2012

(51) Int. Cl.
*G06F 17/30* (2006.01)
*G06F 17/27* (2006.01)

(52) U.S. Cl.
CPC .... *G06F 17/30737* (2013.01); *G06F 17/2735* (2013.01); *G06F 17/30693* (2013.01); *G06F 17/30864* (2013.01)

(58) Field of Classification Search
CPC ......... G06F 17/30463; G06F 17/30864; G06F 8/425; G06F 17/277; G06F 17/30666
USPC .................. 707/708, 726, 739, 771, 999.005
See application file for complete search history.

(56) References Cited

U.S. PATENT DOCUMENTS

| | | | | |
|---|---|---|---|---|
| 5,331,556 A | * | 7/1994 | Black et al. | 704/9 |
| 5,721,938 A | * | 2/1998 | Stuckey | 704/4 |
| 5,794,050 A | | 8/1998 | Dahlgren et al. | |
| 5,873,056 A | * | 2/1999 | Liddy et al. | 704/9 |
| 5,878,385 A | * | 3/1999 | Bralich et al. | 704/9 |
| 5,940,821 A | * | 8/1999 | Wical | |
| 5,960,384 A | * | 9/1999 | Brash | 704/9 |
| 6,101,515 A | | 8/2000 | Wical et al. | |
| 6,389,436 B1 | | 5/2002 | Chakrabarti et al. | |
| 6,510,417 B1 | * | 1/2003 | Woods et al. | 704/275 |
| 6,516,312 B1 | * | 2/2003 | Kraft et al. | 707/610 |
| 6,675,159 B1 | * | 1/2004 | Lin et al. | |
| 6,766,320 B1 | | 7/2004 | Wang et al. | |

(Continued)

FOREIGN PATENT DOCUMENTS

EP         1939797 A1      7/2008
WO    2009/006911 A1      1/2009

OTHER PUBLICATIONS

Wang; et al., "Semi-Supervised Learning of Semantic Classes for Query Understanding—from the Web and for the Web"—Published Date: 2009, http://citeseerx.ist.psu.edu/viewdoc/download?doi=10.1.1.159.6201&rep=rep1&type=pdf.

(Continued)

*Primary Examiner* — Mohammed R Uddin
(74) *Attorney, Agent, or Firm* — Rainier Patents, P.S.

(57) ABSTRACT

One or more techniques and/or systems are disclosed for creating an expanded or improved lexicon for use in search-based semantic tagging. A set of first documents can be identified using a set of first lexicon elements as queries, and one or more first document patterns can be extracted from the set of first documents. The document patterns can be used to find one or more second documents in a query log that comprise the document patterns, which are associated with query terms used to return the second documents. The query terms for the second documents can be extracted and used to expand the lexicon. Elements within the lexicon may be weighted based upon relevance to different query domains, for example.

21 Claims, 8 Drawing Sheets

(56) References Cited

U.S. PATENT DOCUMENTS

| | | | |
|---|---|---|---|
| 7,027,974 B1* | 4/2006 | Busch | G06F 17/271 704/4 |
| 7,027,975 B1* | 4/2006 | Pazandak et al. | 704/9 |
| 7,269,598 B2 | 9/2007 | Marchisio | |
| 7,493,251 B2 | 2/2009 | Gao et al. | |
| 7,730,085 B2 | 6/2010 | Hassan et al. | |
| 8,019,748 B1* | 9/2011 | Wu et al. | 707/713 |
| 2002/0152202 A1 | 10/2002 | Perro et al. | |
| 2003/0061570 A1* | 3/2003 | Hatori et al. | 715/530 |
| 2003/0191625 A1 | 10/2003 | Gorin et al. | |
| 2006/0212433 A1 | 9/2006 | Stachowiak et al. | |
| 2007/0143176 A1* | 6/2007 | Nong | G06F 17/30864 705/14.49 |
| 2007/0250306 A1 | 10/2007 | Marcu et al. | |
| 2007/0294200 A1* | 12/2007 | Au | G06F 17/30696 706/55 |
| 2008/0104032 A1* | 5/2008 | Sarkar | 707/3 |
| 2008/0256069 A1 | 10/2008 | Eder | |
| 2008/0301121 A1* | 12/2008 | Suzuki | G06F 17/30734 |
| 2009/0037398 A1 | 2/2009 | Horvitz et al. | |
| 2009/0089373 A1 | 4/2009 | Donato et al. | |
| 2009/0164895 A1* | 6/2009 | Baeza-Yates et al. | 715/700 |
| 2009/0271179 A1 | 10/2009 | Marchisio et al. | |
| 2010/0010804 A1* | 1/2010 | Friedman et al. | 704/9 |
| 2010/0070448 A1 | 3/2010 | Omoigui | |
| 2010/0161639 A1 | 6/2010 | Bobrow et al. | |
| 2010/0268725 A1 | 10/2010 | Wang et al. | |
| 2010/0281025 A1* | 11/2010 | Tsatsou | G06Q 30/02 707/733 |
| 2011/0071819 A1* | 3/2011 | Miller et al. | 704/9 |
| 2012/0271788 A1* | 10/2012 | Fang et al. | 706/50 |
| 2013/0041921 A1* | 2/2013 | Cooper | G06F 17/30672 707/780 |

OTHER PUBLICATIONS

Natsev; et al., "Semantic Concept-Based Query Expansion and Re-ranking for Multimedia Retrieval"—Published Date: Sep. 23-28, 2007, http://citeseerx.ist.psu.edu/viewdoc/download-?doi=10.1.1.153.5116&rep=rep1&type=pdf.

Kuijjer, Casper, "Semantic Lexicon Expansion using Bootstrapping and Syntax-based, Contextual Extraction Patterns"—Published Date: Aug. 21, 2007 http://www.kuijjer.com/wp-content/uploads/2009/01/thesis.pdf.

Oh; et al., "Semantic passage segmentation based on sentence topics for question answering"—Published Date: 2007 http://ir.kaist.ac.kr/papers/2007/Semantic%20passage%20segmentation%20based%20on%20sentence%20topics%20for%20question%20answering.pdf.

Pasca; et al., "Weakly-Supervised Acquisition of Open-Domain Classes and Class Attributes drom Web Documents and Query Logs", Jun. 2008, http://citeseerx.ist.psu.edu/viewdoc/download-?doi=10.1.1.164.5987&rep=rep1&type=pdf.

Pantel et al., "Espresso: Leveraging Generic Patterns for Automatically Harvesting Semantic Relations," Proceedings of the 21st International Conference on Computational Linguistics and the 44th annual meeting of the Association for Computational Linguistics, Jul. 17, 2006, pp. 113-120, 8 pages.

Talukdar et al., "Weakly-Supervised Acquisition of Labeled Class Instances using Graph Random Walks," Proceedings of the 2008 Conference on Empirical Methods in Natural Language Processing, Oct. 25, 2008, pp. 582-590, 9 pages.

TextGraphs: Graph-based Algorithms for Natural Language Processing, retrieved at <<http://lit.csci.unt.edu/~textgraphs/ws06/>> on Apr. 9, 2006, 3 pages.

Wang et al., "Automatic Set Expansion for List Question Answering," Conference on Empirical Methods in Natural Language Processing, Oct. 25, 2008, pp. 947-954, 8 pages.

Wang et al., "Comination of Statistical and Rule-Based Approaches for Spoken Language Understanding," International Conference on Spoken Language Processing, Sep. 1, 2002, pp. 609-612, 4 pages.

Etzioni et al., "Advances in IE for the Web," Dec. 11, 2008, retrieved at <<http://www.scienceforseo.com/uncategorized/advanc.es-in-ie-for-the-web>>, 6 pages.

Jones, Rosie, "Semi-supervised Learning on Small Worlds," Link Discovery Workshop at KDD, 2004, 9 pages.

Wang et al., "Automatic Set Instance Extraction using the Web," WWW2009, Apr. 20-24, 2009, 8 pages.

Agichtein et al., "Snowball: Extracting Relations from Large Plain-Text Collections," Proceedings of the Fifth ACM Conference on Digital Libraries, Jun. 1, 2000, pp. 85-94, 10 pages.

Cafarella et al., "WebTables: Exploring the Power of Tables on the Web," VLDB'08, Aug. 1, 2008, 12 pages.

Riloff et al., "Learning Dictionaries for Information Extraction by Multi-Level Bootstrapping," Proceedings of the 16th National Conference on Artificial Intelligence (AAAI-99 ), Jul. 18-22, 1999, Powerpoint Presentation, 17 pages.

Etzioni et al., "Methods for Domain-Independent Information Extraction from the Web: An Experimental Comparison," American Association for Artificial Intelligence, Jul. 25, 2004, 8 pages.

Non-Final Office Action dated May 25, 2011 from U.S. Appl. No. 12/426,370, 29 pages.

Response filed Aug. 25, 2011 to the Non-Final Office Action dated May 25, 2011 from U.S. Appl. No. 12/426,370, 13 pages.

Final Office Action dated Oct. 6, 2011 from U.S. Appl. No. 12/426,370, 35 pages.

Response filed Jan. 5, 2012 to the Final Office Action dated Oct. 6, 2011 from U.S. Appl. No. 12/426,370, 13 pages.

Non-Final Office Action dated Mar. 1, 2012 from U.S. Appl. No. 12/426,370, 34 pages.

Response filed Jul. 2, 2012 to the Non-Final Office Action dated Mar. 1, 2012 from U.S. Appl. No. 12/426,370, 13 pages.

Final Office Action dated Jul. 16, 2014 from U.S. Appl. No. 12/426,370, 33 pages.

Response filed Oct. 16, 2014 to the Final Office Action dated Jul. 16, 2014 from U.S. Appl. No. 12/426,370, 16 pages.

Non-Final Office Action dated Aug. 27, 2015 from U.S. Appl. No. 12/426,370, 43 pages.

Response filed Dec. 3, 2015 to the Non-Final Office Action dated Aug. 27, 2015 from U.S. Appl. No. 12/426,370, 15 pages.

Applicant-Initiated Interview Summary dated Dec. 10, 2015 from U.S. Appl. No. 12/426,370, 3 pages.

Notice of Allowance dated Feb. 26, 2016 from U.S. Appl. No. 12/426,370, 17 pages.

Talukdar et al., "A Context Pattern Induction Method for Named Entity Extraction," Proceedings of the 10th Conference on Computational Natural Language Learning (CoNLL-X), Jun. 8, 2006, pp. 141-148, 8 pages.

Riloff et al., "Learning Dictionaries for Information Extraction by Multi-Level Bootstrapping," AAAI-99 Proceedings, Jul. 1999, pp. 474-479, 6 pages.

Li et al., "Extracting Structured Information from User Queries with Semi-Supervised Conditional Random Fields," Proceedings of the 32nd ACM SIGIR Conference, Jul. 19-23, 2009, pp. 572-579, 8 pages.

McCallum et al., "Early Results for Named Entity Recognition with Conditional Random Fields, Feature Induction and Web-Enhanced Lexicons," Proceedings of the 7th Conference on Natural Language Learning (CoNLL), vol. 4, May 31, 2003, pp. 188-191, 4 pages.

Sarawagi et al., "Semi-Markov Conditional Random Fields for Information Extraction," Proceedings of Advances in Neural Information Processing Systems, vol. 17, Dec. 13, 2004, pp. 1185-1192, 8 pages.

Sha et al., "Shallow Parsing with Conditional Random Fields," Proceedings of Human Language Technology Conference and the Conference of the North American Chapter of the Association for Computational Linguistics, vol. 1, May 27, 2003, pp. 134-141, 8 pages.

Zhou et al., "Learning with Local and Global Consistency," NIPS, vol. 16, No. 16, Dec. 9, 2003, pp. 321-328, 8 pages.

Zhou et al., "Semi-supervised Learning on Directed Graphs," NIPS, vol. 5, Dec. 1, 2004, pp. 1633-1640, 8 pages.

(56) References Cited

OTHER PUBLICATIONS

Zhu, Xiaojin, "Semi-Supervised Learning with Graphs," Carnegie Mellon University, Language Technologies Institute, School of Computer Science, Doctoral Thesis, May 2005, 174 pages.

Hearst, Marti A., "Automatic Acquisition of Hyponyms from Large Text Corpora," Proceedings of COLING-92, Aug. 23-28, 1992, pp. 539-545, 7 pages.

Komachi et al., Minimally Supervised Learning of Semantic Knowledge from Query Logs, IJCNLP-08, Apr. 3, 2009, 22 pages.

Lafferty et al., "Conditional Random Fields: Probabilistic Models for Segmenting and Labeling Sequence Data," Carnegie Mellon University, School of Computer Science, 2001, 8 pages.

Li et al., "Learning Query Intent from Regularized Click Graphs," SIGIR '08, Jul. 20-24, 2008, 8 pages.

Lin et al., "Concept Discovery from Text," Proceedings of the 19th International Conference on Computational Linguistics, vol. 1, Aug. 24, 2002, 7 pages.

Page et al., "The PageRank Citation Ranking: Bringing Order to the Web," Powerpoint Presentation at ODU, Norfolk, Jan. 31, 2007, 29 pages.

Peng et al., "Accurate Information Extraction from Research Papers using Conditional Random Fields," retrieved at <<www.cs.unmass.edu/~mccallum/papers/hlt2004.pdf>>, 2004, 8 pages.

\* cited by examiner

SEARCH LEXICON EXPANSION

BACKGROUND

In a computing environment, a search engine can be used to identify documents, such as webpages, related to user input search terms. A personal assistant system may be able process both spoken and textual queries, such as to a search engine, and help users with customized tasks, such as hotel booking or restaurant reservation. A natural language understanding can be unified with keyword query understanding for information retrieval and task completion applications. For example, given a spoken query "show me Gone with the Wind trailers" or simply a keyword query "Gone with the Wind trailers", a system may be able to understand that the user's intent is to find trailers of the movie titled "Gone With the Wind", and to take relevant actions accordingly, such as retrieving appropriate webpages, or directing the user to a location that shows the trailers.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Query intent understanding may be a key component in information retrieval and automatic task completion applications. Understanding a query intent can comprise identifying a query term's semantic class (e.g., query domain), and/or understanding the query term's semantic structure. For example, for a query "Book me a double room for 2 at Marriot Bellevue on Friday", semantic tagging may be used to extract meaningful semantic parts of the query, and semantic labels can be attached accordingly.

When analyzing these types of natural language or keyword queries, pre-existing lexicons can be important features for semantic tagging (e.g., applying an appropriate query domain to a lexicon term). However, pre-existing lexicons collected from a structured entity database may suffer from multiple problems. For example, coverage of semantic meaning for terms can be limited, as the elements in users' queries are often different from their formal forms in a structured database (e.g., using Starbucks in a search instead of Starbucks Coffee). Further, respective elements in a lexicon are usually weighted equally, even though some lexicon elements may be more popular or ambiguous than others (e.g., a term such as "neighbors" may be given the same weight as "McDonalds" when both terms appear in a restaurant database).

Accordingly, one or more techniques and/or systems are disclosed that can utilize a large-scale query log to expand a semantic lexicon and to assign relative weights to its elements. In this way, semantic tagging may be improved, and search performance enhanced. For example, the parts of a search query can be identified by lexicon elements and appropriately labeled according to a query domain (e.g., semantic meaning) by expanding the lexicon used in the searches to include more lexicon elements (e.g., which are consistent with what users actually query), and by weighting lexicon elements according to their importance. In one embodiment, query domains can comprise a category of entities (e.g., hotels, restaurants, locations, etc.) that are described by a query term.

In one embodiment for creating an expanded or improved lexicon for use in search-based semantic tagging, a second document can be identified from a query log using a document pattern that has been extracted from a set of one or more first documents in the query log. Here, the set of one or more first documents can be identified using a set of one or more first lexicon elements, such as seed elements, as first queries for the query log. A second lexicon element can be extracted from a second query that has been identified using the second document from the query log, and the second lexicon element can be used to expand the lexicon.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
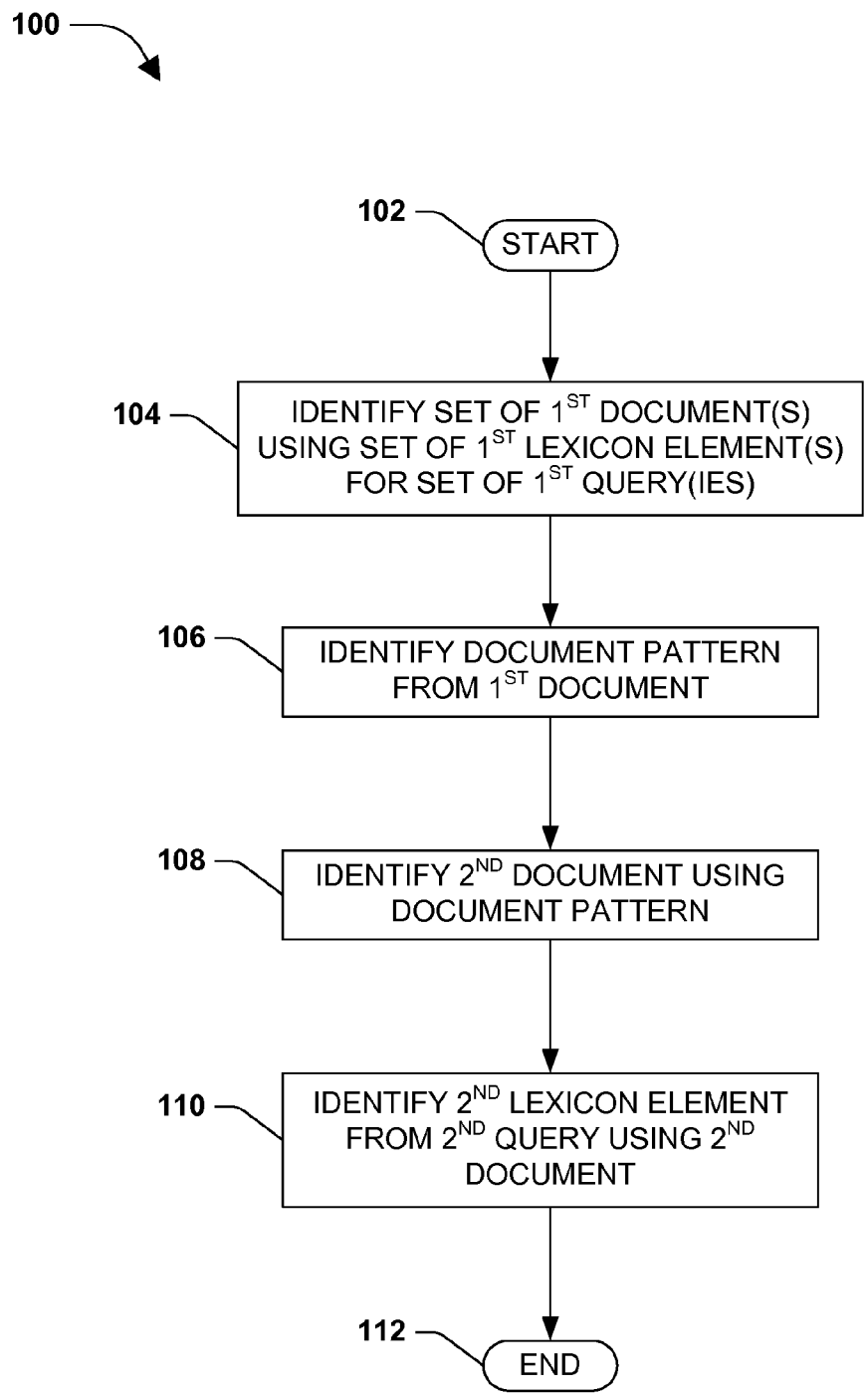
FIG. 1 is a flow diagram of an exemplary method for creating an improved lexicon for use in search-based semantic tagging.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A method may be devised that provides for expanding a lexicon of elements that may be used in a search operation, where a lexicon generally comprises a dictionary of entities of a certain class (e.g., respective elements in a lexicon comprise a surface form of an entity). For example, online search terms used in a query can identify a particular item that belongs to a general search area (e.g., location, hotel, movie, etc.). In this example, a lexicon database may be used to link search terms to these particular search areas, such as McDonalds to restaurants. The lexicon may be expanded by identifying a use of search terms in relation to search areas, and extracting identifiable lexicon elements to add to the database, for example.

FIG. 1 is a flow diagram of an exemplary method 100 for creating an improved lexicon for use in search-based semantic tagging. The exemplary method 100 begins at 102 and involves identifying a first document (e.g., webpage) using a first lexicon element for a first query, at 104. For example, a lexicon database, such as one used by a search engine, may comprise one or more elements (e.g., seed elements). In this example, a seed element may be used in a search query using the search engine, and a document returned by the search can comprise the first document, which may be logged in a query log comprising information related to the search (e.g., search term(s), returned document information, such as URL, title, snippets of doc, etc.). Further, a plurality of first documents can be identified from one or more searches using a set of one or more seed elements (e.g., a plurality of first documents may be returned from a search using the seed elements "McDonalds" and "The Cheesecake Factory", where information relating to the search and returned documents can be logged in a query log).

At 106, a document pattern can be identified from a set of one or more first documents, such as using information from the query log. A document pattern can comprise an identifiable pattern from the document (e.g., webpage) that may be linked or otherwise associated with the lexicon element. For example, when a search engine returns results for a search, the results (e.g., which may be logged in a query log) often comprise, among other things, a title for the document, a snippet of the document, and a web address (e.g., URL). Accordingly, where one or more webpages are returned from one or more searches comprising the terms "McDonalds" and/or "The Cheesecake Factory" and/or other seed elements, for example, and the respective titles of the webpages comprise the term "restaurant", the pattern may comprise finding the term "restaurant" in the title of the document, which may be identified from information in the query log.

At 108 in the exemplary method 100, a second document is identified from the query log using the document pattern identified from the set of first documents in the query log. For example, the query log may comprise a plurality of information for searches that have been performed, such as by one or more online search engines. In this example, documents in the query log can be searched to find the pattern that was identified from the set of first documents, such as a particular word in the document title, snippet, URL, or some other part of the document. If the pattern is found in another document, such as a webpage, this document can be the second document. Further, a plurality of second documents may be identified in the query log using the identified document pattern. For example, where a document pattern has been identified as comprising the term "restaurant" in the title of the document, then one or more documents that comprise the term "restaurant" in their respective titles (e.g., as identified from a query log) may be identified as the second document.

At 110, a second lexicon element is identified for the lexicon from a second query identified using the second document from the query log. For example, information in the query log can comprise search query terms that were used to return the second document. As an illustrative example, the second document may have been identified as comprising the document pattern because the term "restaurant" was in the title of the document. In this example, the second document may comprise a webpage for Denny's restaurants. Further, a query that was used in the second search, as identified in the query log, and which returned the second document may comprise a search term "Denny's." Therefore, in this example, the second lexicon element identified using the second document can comprise "Denny's." In this way, for example, a plurality of restaurant names may be identified and added to the lexicon.

While more popular and well known names, such as Denny's and McDonalds, may already be included in a typical lexicon, the exemplary method 100 may provide for identifying local names, and/or less well know names of restaurants, for example, which can be added to the lexicon. Further, while restaurants may comprise one query domain, the exemplary method may be applied to any one or more of a plurality of query domains, such as hotels, locations, cities, dates, and/or any other search area of interest to a user of a search engine.

In this way, for example, the lexicon used by the search engine can be expanded to include information about particular query domains, so that more appropriate response information may be returned. As an illustrative example, if the user enters a type of natural language search, such as "find a room at the Marriott in Seattle on Friday," into a query for a search engine, the lexicon can be used to identify Marriott as a hotel, Seattle as a city, Friday as a date, and associate the terms "find a room" in a proper context with the other query terms. In this illustrative example, the returned results may comprise a reservation page for the Marriott in Seattle, with appropriate dates and rates filled in. Moreover, given that Marriott may be identified as a hotel and that the lexicon may be expanded to include other hotels, the search results may also comprise similar reservations pages, for example, for other hotels.

Having identified a $2^{nd}$ lexicon element for the lexicon, the exemplary method 100 ends at 112.

Figure 2:
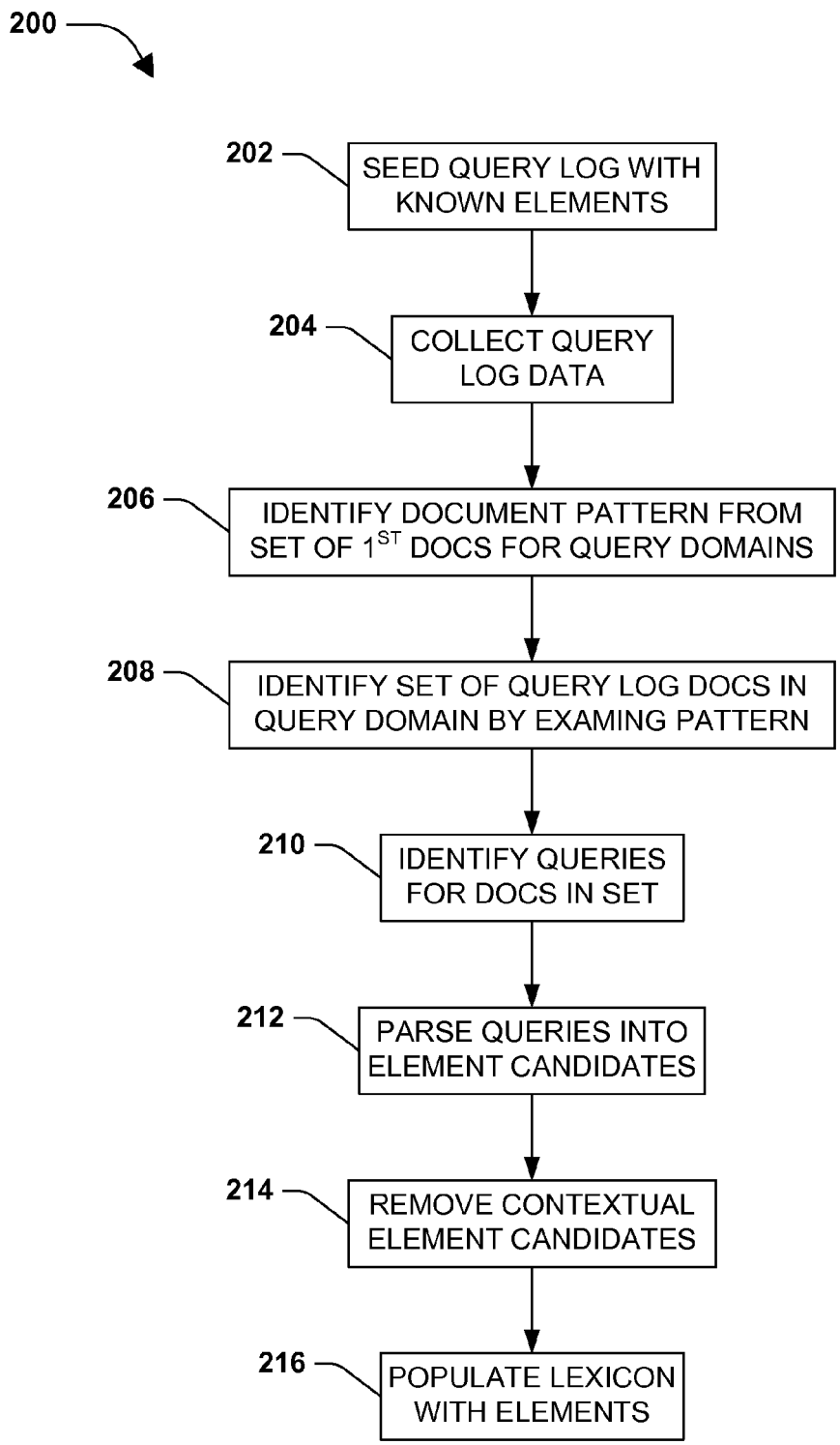
FIG. 2 is a flow diagram illustrating one embodiment of one or more portions of a method for creating an improved lexicon for use in search-based semantic tagging may be implemented.

FIG. 2 is a flow diagram illustrating one embodiment 200 of one or more portions of a method for creating an improved lexicon for use in search-based semantic tagging may be implemented. At 202, a query log is seeded using one or more known lexicon elements (seed elements). For example, the query log can comprise information that identifies particular documents returned from an online search (e.g., using an online search engine) as well as the search terms (e.g., seed element(s)) used in the search. In one embodiment, seeding the query log can comprise using lexicon (seed) elements that are associated with a known query domain (e.g., "Seattle" for the domain of "city").

In one embodiment, the query log can comprise a search term and one or more documents (e.g., webpages) that are returned from the search, where information for the respective documents may comprise, among other things, the document title, universal resource locator (e.g., web address), and/or a snippet of content taken from the document. Other information that may be logged in a query log for documents comprises one or more portions of document code, documents types, embedded links, webapps, formatting, and/or other information mined from respective documents returned from a search using a seed element as a search term, for example. Seeding the query log can provide for identification of document information that is associated with a know query domain, for example.

At 204, query log data is collected. For example, one or more search engines may be monitored, and search-related information, such as query terms, retrieved documents, and/or click statistics, etc. can be collected (e.g., without retrieving personal user-related information). In this example, searches that comprise one of the seed elements can be identified in the query log, and the documents returned by these searches can also be identified. In one embodiment, the query log can comprise information collected during a desired period of time (e.g., previous three months), and/or one or more search engines may be continually monitored to provide updated information for the query log.

At 206, one or more document patterns for a first query domain can be identified. For example, a set of one or more first lexicon elements (e.g., seed elements) of a first query domain (e.g., city, restaurant, etc.) can be used in a set of one or more first queries and a first pattern can be identified and extracted (e.g., by consulting a query log) from a set of first documents resulting from the set of first queries (e.g., where terms such as first, second, etc. are merely used as identifiers herein, and thus, unless indicated otherwise, do not necessarily indicate an ordering of items, temporally or otherwise). In one embodiment, respective first lexicon elements may be provided for respective query domains, such that respective document patterns may be identified for the respective query domains.

As an illustrative example, seed elements "Gone With The Wind" and/or "Avatar" for the domain of movie titles may yield documents, which may be logged to a query log, and which may comprise one or more particular patterns. For example, webpages that are returned by searches comprising "Gone With The Wind", "Avatar" and/or other movie related seed elements may comprise an identifiable pattern in their corresponding URLs. For example, the IMDB website comprises a database of movie titles, and associated information, where respective movies titles are identified by a code in a URL for the movie on that website. Accordingly, a document pattern for the query domain of movie titles may comprise a particular type of id code incorporated into a URL, for example.

It may be appreciated that seed elements may be associated with more than one query domain, such that one element may yield patter(s) for more than one query domain. For example, a lexicon element "New York" may be associated with query domains of both "city" and "hotel" (e.g., because there is a hotel named New York in Las Vegas and/or elsewhere). In one embodiment, respective document patterns may be identified from resulting documents based upon one or more keywords in a document title, one or more keywords in a document snippet, one or more expressions in a document URL and/or one or more identifiers in the document, etc.

At 208, a set of second documents can be identified in the query log using the extracted document pattern, for respective query domains. For example, the set of one or more first lexicon elements (e.g., seed elements) was used to identify documents that were retrieved from searches using the one or more first lexicon elements, so that a document pattern for the query domain associated with the set of first lexicon elements may be identified. In this embodiment, for example, the extracted pattern can then be used to identify other documents logged by the query log that may also be associated with the query domain, but were not identified by the set of one or more first lexicon elements.

As an illustrative example, the document pattern may have been extracted from documents returned from searches comprising a query term "Thomasville", "IKEA" and/or other seed elements, which are associated with a furniture query domain. In this example, the pattern may comprise a snippet of the document that includes the word "furniture." In this embodiment, for example, the query log can be searched for documents that comprise the word "furniture" in their respective snippets. In this example, the one or more documents identified can comprise a set of second documents for a particular query domain, respectively comprising the extracted document pattern (e.g., .keyword "furniture" in snippet for domain of furniture (but that were not returned when element "Thomasville was used as search element)).

In one embodiment, identifying a second document in the query log can comprise comparing the extracted document pattern to one or more of portions of the query log documents, such as: a document title; a document snippet; a document URL; and a body of the document. For example, as described above, searches performed by users of a search engine often return a list of documents respectively identified by a document title, URL and a snippet of content from the document. In this example, this information can be logged by the query log, and the query log can subsequently be searched for documents that meet the document pattern for a query domain.

At 210, one or more second queries can be identified using the one or more second documents. In one embodiment, identifying the second query can comprise identifying one or more query terms in the query log that were used to return the second document. For example, the one or more second documents identified in the query log can be logged based on a search performed using a search engine, and one or more search terms that formed a query used to retrieve the second document can be identified. These search terms (e.g., as one or more queries) may be identified as the second query. For example, where a second set of documents comprises documents that have the keyword "furniture" in a snippet for the domain of furniture, then the respective search terms used to produce these documents may be identified as the corresponding second queries.

At 212, the identified second queries can be parsed, and respective lexicon element candidates can be identified. In one embodiment, a second query can be parsed into its respective query elements, and the lexicon candidates can be extracted, where the candidates comprise a query element. In another embodiment, the identified queries that resulted in the second document(s) may be used as a lexicon element candidate without being parsing. For example, a query that resulted in the second document selection may be a name of a restaurant for a restaurant name domain, a movie title for a movie title domain, a city name for a city domain, etc., which can then become a lexicon element candidate (e.g., that may ultimately be used to expand an existing lexicon).

At 214, one or more lexicon element candidates, from the identified one or more second queries, can be removed. For example, the one or more second lexicon elements can comprise a contextual query term that is not relative to a query domain. For example, search terms are often included in a query that are merely contextual, and don't correspond to a particular query domain. As an illustrative example, a user may query "how long does it take to drive from Cleveland to New York City." In this example, Cleveland and New York City can comprise lexicon elements that relate to a query domain, such as city names, but the remaining terms in the query do not correspond to a query domain. As another example, a user may query "Gone with the Wind movie times". The lexicon element can comprise Gone with the Wind, in this example, but not "movie times". That is, remaining query terms that are merely contextual to the search can be removed, for example, as they may not relate to a particular query domain.

At 216, the identified (e.g., and extracted) elements can be added to a(n existing) lexicon. In this way, for example, the lexicon used by one or more search engines can be expanded to include search terms that are associated with know query domains. For example, a local restaurant may be called Barnacle Bill's Seafood Restaurant. However, most searches for this restaurant merely use Barnacle Bill's (e.g., or some derivation, such as Barnicle Bills, or Barnacle Bill). In this example, the terms Barnacle Bill's (e.g., and other derivations) may be identified as associated with the restaurant query domain, and appropriately added to the lexicon for the search engine. Further, the process of the exemplary embodiment 200 can be iterated, in a sort of bootstrap manner, to continue to add more and more lexicon elements using elements added to the expanding lexicon.

In one aspect, a lexicon can comprise a plurality of elements that are respectively associated with one or more different query domains. For example, a lexicon element New York may be associated with query domains of city, state, hotel, song, etc. (e.g., New York City, New York state, hotel in Las Vegas, song by Frank Sinatra, etc.). Similarly, other elements in the lexicon may likewise be associated with one or more different query domains.

In this aspect, in one embodiment, a selection weight can be assigned to a lexicon element in the lexicon, for example, particularly where the element may be associated with two or more query domains. For example, a selection weight for an element may be based on popularity of the lexicon element in a query domain and/or a likelihood or appropriateness of the lexicon element in the particular query domain (e.g., the lexicon New York may have a lower selection ranking than the lexicon Marriott in a query domain of "hotels"). That is, for example, the weight can be based on a ranking of use of the term in searches in a particular query domain (e.g., Bellagio may have a higher ranking than New York in a query domain of "casino"). Similarly, a weighting can be based on a probability that a particular query domain is associated with a particular element (e.g., query domain of "city" has a higher probability than query domain of "hotel" for the element New York).

Figure 3:
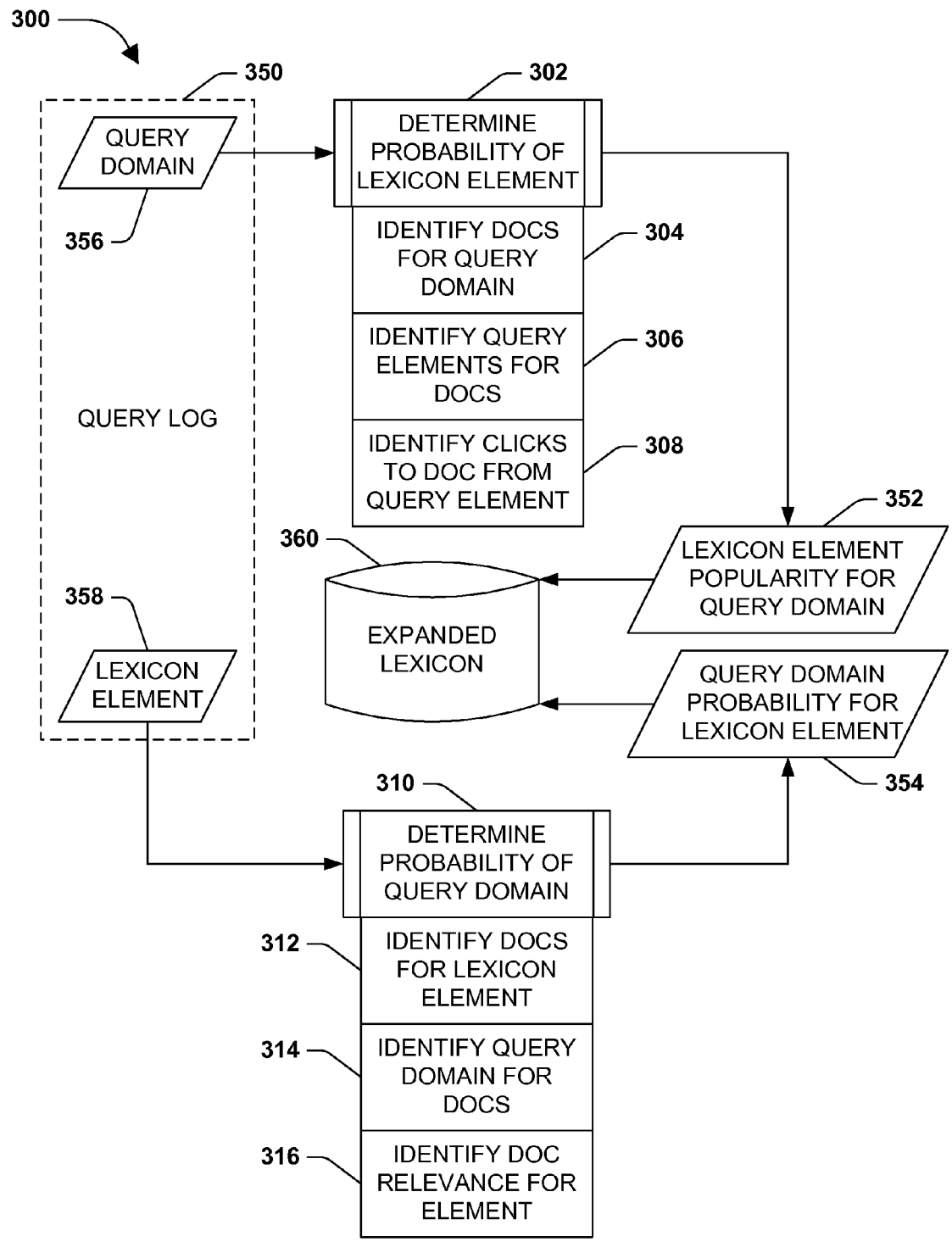
FIG. 3 is a flow diagram illustrating an example embodiment where one or more techniques described herein may be implemented.

FIG. 3 is a flow diagram illustrating an example embodiment 300 where one or more techniques described herein may be implemented. At 302, a probability of a lexicon element 358 for a particular query domain 356 can be determined. In one embodiment, a query log 350 can be used to determine the popularity 352 (e.g., as a probability) for the lexicon element given the query domain 356. For example, a number of times that a particular lexicon element is used in searches for a particular query domain can be identified as an indication of this popularity (e.g., and can also be used for weighting the lexicon element).

At 304, in order to determine the probability of the lexicon element, documents associated with the given query domain are identified in the query log. For example, a set of documents from the query log may be identified as related to a particular query domain, based on logged returned results. From the set of documents associated with the given query domain, at 306, query elements can be identified. For example, the query log can be used to identify those elements that were used in searches that returned the documents in the set for the query domain.

At 308, to determine the popularity of the lexicon element in the query domain documents, selection counts (e.g., click counts) for the set of query domain documents (from the query log) can be used. For example, a number of times a document was selected from returned results for a query can be logged in the query log. In this example, this "click-count" can identify how many times the document is selected when a particular search term (e.g., query element or lexicon element) is used. In this way, in this example, the likelihood that the lexicon element belongs to the query domain can be identified by determining how many times the documents associated with the query domain are selected when the lexicon element is used in a search.

In the example embodiment 300, the probability of the lexicon element for the particular query domain determined at 302 can be used as an indication of the popularity designation at 352. In this embodiment, the popularity 352 may be used as a weight for the lexicon element in an expanded lexicon 360. For example, one lexicon element may have a higher popularity weight than another, therefore the lexicon element having a higher weighting may be used in a search over the lexicon element with the lower popularity weighting.

In one embodiment, determining the probability of the lexicon element given the query domain can comprise combining a probability of the lexicon element given a set of query domain documents from the query log with a probability of the query domain documents from the query log given the query domain. For example, a generative model may be used, where a log probability p of a lexicon element w (e.g., surface form comprising the words of the lexicon element), given a query domain y, such as p(w|y), may be used as a feature value for a semi-Markov conditional random fields (CRF) information extraction.

In this example, $p(w|y)=\Sigma_{d_y} p(w|d_y) \times p(d_y|y)$, where $p(d_y|y)$ can represent a popularity (e.g., based on click counts) of a document in the set of query domain documents (relevant document), with respect to the query domain, and $p(w|d_y)$ can represent a probability of the lexicon element given the relevant document. In one embodiment, the probability of the relevant document $d_y$ given the query domain y can be defined as a ratio of selection counts on $d_y$ over a selection count for the respective document in the query domain. Further, in one embodiment, the probability of the lexicon element w given the relevant document $d_y$ can be defined as a ratio of selection counts on $d_y$ that were triggered by a query comprising w, over a total count of all selections of $d_y$, which were triggered by respective relevant queries for the query domain.

At 310 in the example embodiment 300, a probability of a query domain for a particular lexicon element can be determined. In one embodiment, the query log 350 can be used to determine a probability 354 (e.g., as a likelihood) for the query domain given the lexicon element 358. For example, where a greater number of documents for a first query domain are returned and a lesser number of documents for a second query domain are returned by a search using the lexicon element, then the probability of the first query domain for the lexicon element can be higher than the probability of the second query domain for the lexicon element.

At 312, in order to determine the probability of a query domain for the lexicon element 358, documents associated with the given lexicon element are identified in the query log 350. For example, a set of documents from the query log may be identified as related to a particular lexicon element, based on logged returned results. From the set of documents associated with the given lexicon element, at 314, query domains can be identified. For example, the query log can be used to identify those domain that are associated with the identified documents. In this manner, the probability of identified domains to the element may be determined. For example, where more documents are returned for one domain than another, then the domain corresponding to the greater number of documents may be may be more likely to be more relevant to the lexicon element.

Additionally or alternatively, the probability of a query domain to a lexicon element can be determined at 316 based upon the relevance of a returned document to a particular query domain. That is, for example, where a returned document is regarded as highly relevant to the query domain (as mined from the query log), then the query domain of that document may be regarded as highly relevant to the lexicon element yielding that document (e.g., regardless of whether few or many documents corresponding to that query domain are returned). Moreover, where a document is associated with multiple query domains, and the relevance of that document to those domains is known (e.g., domains are ranked or ordered such that document is considered most relevant to top listed domain and least relevant to bottom listed domain, etc.), then the domain considered most relevant to the document may be regarded as having a higher relevance to the lexicon element, the domain considered least relevant to the document may be regarded as having a lower relevance to the lexicon element, etc.

In the example embodiment 300, the relevance determined for the query domain can be used as a probability designation 354 of the query domain for the lexicon element. In this embodiment, the probability 354 may be used as a weight for the lexicon element in the expanded lexicon 360 and/or as a weight for a query domain for the lexicon element. For example, one query domain may have a higher relevance weight than another relative to different lexicon elements. Therefore, given the query domain of a search, results associated with one lexicon element may be regarded as more or less relevant than results associated with another lexicon element.

Using merely the generative model, described above, a lexicon element may have a high likelihood weight, but may be confused with another query domain type. For example, Paris is a popular hotel name in Las Vegas, and it may be confused with the city name. In one embodiment, determining the probability of the query domain 354 given the lexicon element 358 can comprise combining a probability of the query domain given the set of query domain documents from the query log with a probability of the query domain documents from the query log given the lexicon element.

For example, a discriminative model may be used, such as to where a feature value of the model is changed while still using the lexicon expanded with the generative model approach, as described above. In this example, the probability (e.g., as a normalized log posterior probability) $p(y|w)$ can be used as the feature value: $p(y|w)=\Sigma_{d_w} p(y|d_w) \cdot p(d_w|w)$. Here, $d_w$ can represent a document that is relevant to the lexicon element w; $p(d_w|w)$ can represent a query-document relevance model; and $p(y|d_w)$ can represent a document classification model, representing the probability that $d_w$ belongs to query domain y.

In this example, to estimate $p(d_w|w)$, a set of documents $d_w$ relevant to w can be obtained. Respective lexicon elements w can be viewed as a query and document patterns (e.g., from snippets) of the top-n ranked documents can be retrieved from a search engine as $d_w$. To estimate $p(y|d_w)$, a set of known lexicon elements (e.g., query seeds) and the top-n document patterns retrieved by each query can be used as positive samples in a classification model training. Further, the top-n document patterns retrieved by a set of domain-irrelevant lexicon elements (e.g., CityName) as negative examples. In one embodiment, a maximum entropy classifier can be trained with these examples, using n-grams in the document patterns as features. The trained classifier may be applied to the top-n documents retrieved by each new lexicon element, and the posterior classification score can be used as $p(y|d_w)$.

Figure 4:
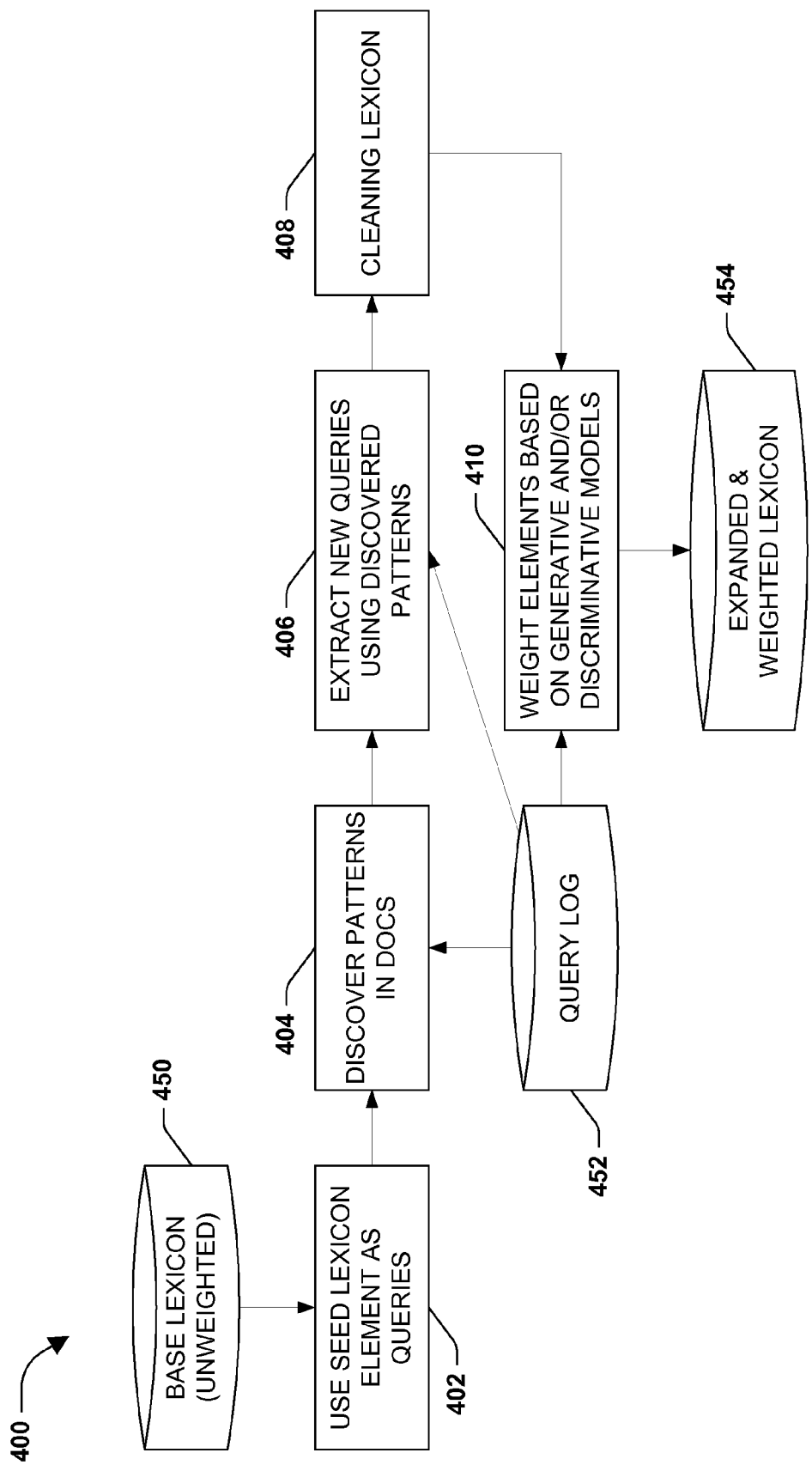
FIG. 4 is a flow diagram illustrating an example embodiment where one or more techniques described herein may be implemented.

FIG. 4 is a flow diagram of an example embodiment 400 where one or more techniques described herein may be implemented. At 402, seed lexicon elements, comprised in a base (e.g., unweighted) lexicon (e.g., stored in a lexicon database), can be used as base queries to retrieve one or more documents from a search using a search engine. At 404, document patterns can be discovered in the documents retrieved by the search, where the search information is stored in a query log 452. Query information can comprise the search terms (e.g., seed lexicon elements) and/or returned documents, respectively comprising a title, URL, and/or snippet information, for example.

At 406, new queries can be extracted from the query log 452 by using the discovered patterns to identify other documents in the query log that comprise the pattern. Query terms that were used to return these other documents can be found in the query log 452 and used as the new queries. These new queries can comprise new lexicon element candidates for the lexicon. At 408, the lexicon element candidates can be cleaned of terms that are merely contextual, such as ones that are not relevant to a query domain.

At 410, the new lexicon element can be weighted using generative and/or the discriminative models, for example, such as those described above and/or others. The weighted new lexicon elements can be added to the lexicon database to create an expanded and weighted lexicon 454. Further, the expanded and weighted lexicon can be used to iterate over the process (e.g., 402 to 410), such as to continue to add more elements to the lexicon.

Figure 5:
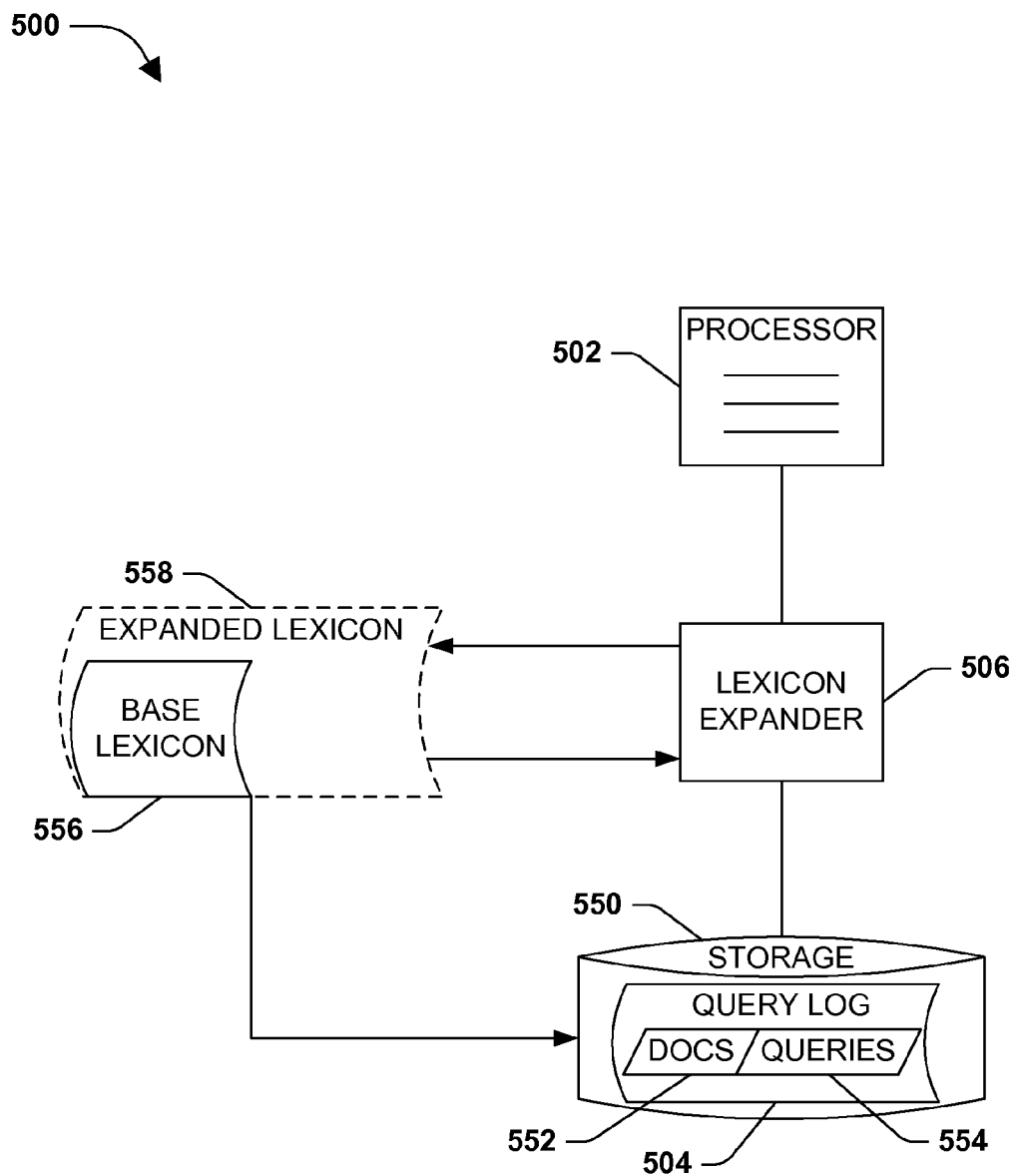
FIG. 5 is a component diagram of an exemplary system for creating an improved lexicon for use in search-based semantic tagging.

A system may be devised and used to add elements to a lexicon used for searching. FIG. 5 is a component diagram of an exemplary system 500 for creating an improved lexicon for use in search-based semantic tagging. A computer-based processor 502 is configured to process data for the system. A query log component 504 is stored on one or more computer-based data storage components 550. The query log component 504 comprises queries 554 (e.g., comprising lexicon elements) and documents 552 linked to the queries 554 (e.g., one or more documents returned as result of one or more of the queries).

A lexicon expansion component 506 is operably coupled with the processor 502 and the query log component 504. The lexicon expansion component 506 identifies a second document for the query log 504 using a document pattern extracted from a set of one or more first documents in the query log 504, where the set of one or more first documents is identified using a set of one or more first lexicon elements, such as from a base lexicon 556, as a set of one or more first queries for the query log 504. Further, the lexicon expansion component 506 identifies a second lexicon element to add to the lexicon 558 from a second query identified using the second document.

Figure 6:
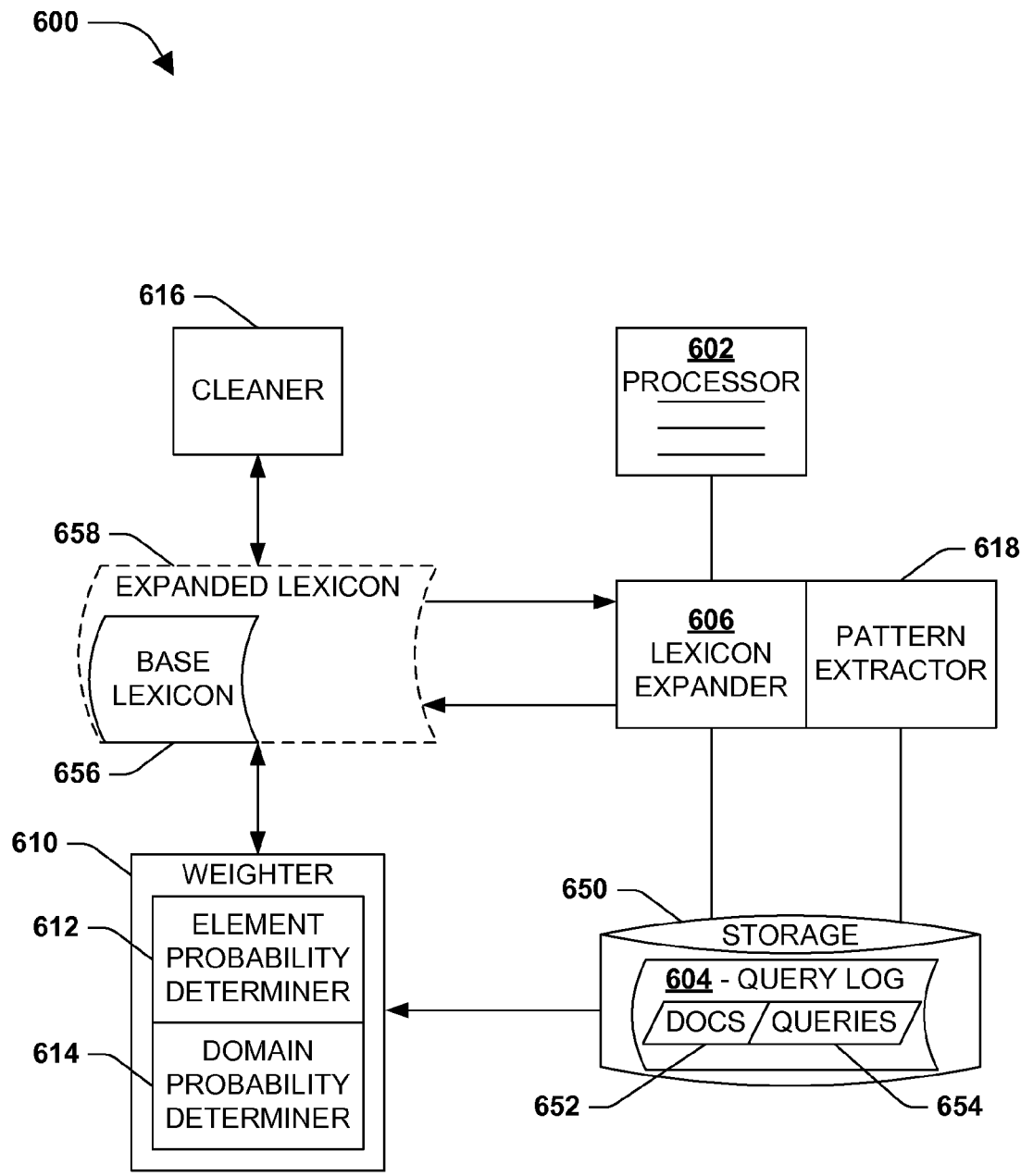
FIG. 6 is a component diagram illustrating an example embodiment where one or more of the systems described herein may be implemented.

FIG. 6 is a component diagram illustrating an example embodiment 600 where one or more of the systems described herein may be implemented. A pattern extraction component 618 can extract, using a processor 602 used to process data for the system, one or more document patterns from one or more first documents 652 in a query log 604 in a storage component 650 obtained using a first lexicon element in one or more first queries 654. The document pattern can comprise, for example, one or more keywords found in a document title, one or more keywords in a document snippet, one or more expressions in a document universal resource locator (URL), and/or one or more identifiers in the document, etc. The document patterns can then be used by a lexicon expander 606 to identify second documents that may be used to identify one or more new lexicon elements to add to an existing lexicon to create an expanded lexicon 658.

A weighting component 610 can assign a selection weight to a lexicon element in the lexicon 658. The selection weight can comprise a popularity of the lexicon element in a query domain, and/or a likelihood of the query domain for the lexicon element. For example, the weight can help determine how popular a lexicon element is in searches, and how probable it is that the element belongs to a particular query domain (e.g., where a lexicon element may fit in more than one query domain).

Further, the weighting component 610 can comprise a lexicon element probability component 612 that determines a probability that the lexicon element belongs to a given query domain, such as to be used as the popularity weight for the lexicon element. Additionally, the weighting component 610 can comprise a query domain probability component 614 that can determine a probability that a query domain corresponds to a given lexicon element.

In this way, a base or seed lexicon 656 can be expanded with weighted lexicon elements to create an expanded lexicon 658. A lexicon cleaning component 616 can remove a lexicon element, such as from a candidate element, that is a contextual query term not relative to a query domain (e.g., remove the term "trailer" from a candidate element comprising "Gone with the Wind trailer").

Figure 7:
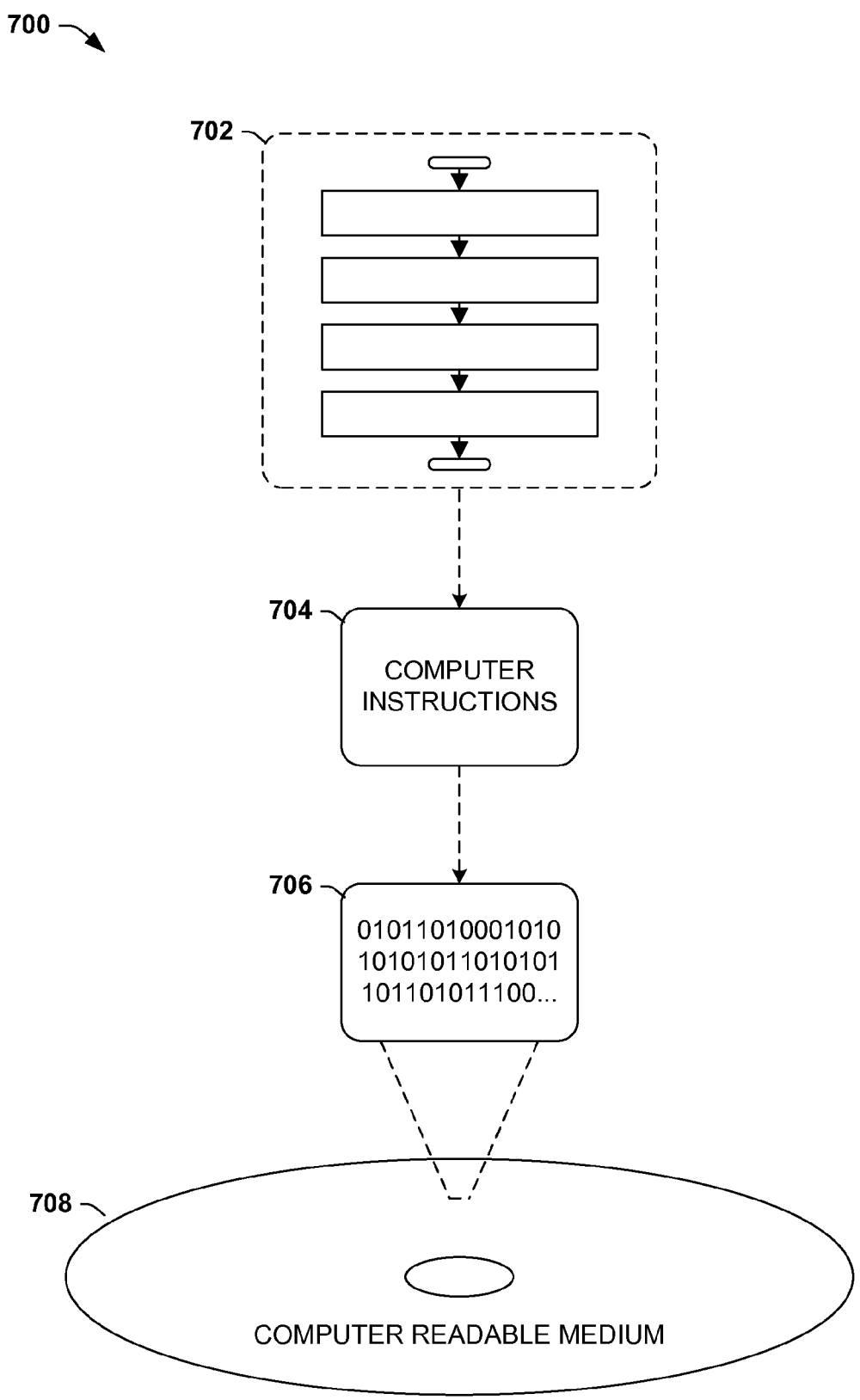
FIG. 7 illustrates an exemplary computing environment wherein one or more of the provisions set forth herein may be implemented.

Still another embodiment involves a computer-readable medium comprising processor-executable instructions configured to implement one or more of the techniques presented herein. An exemplary computer-readable medium that may be devised in these ways is illustrated in FIG. 7, wherein the implementation 700 comprises a computer-readable medium 708 (e.g., a CD-R, DVD-R, or a platter of a hard disk drive), on which is encoded computer-readable data 706. This computer-readable data 706 in turn comprises a set of computer instructions 704 configured to operate according to one or more of the principles set forth herein. In one such embodiment 702, the processor-executable instructions 704 may be configured to perform a method, such as at least some of the exemplary method 100 of FIG. 1, for example. In another such embodiment, the processor-executable instructions 704 may be configured to implement a system, such as at least some of the exemplary system 500 of FIG. 5, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 8:
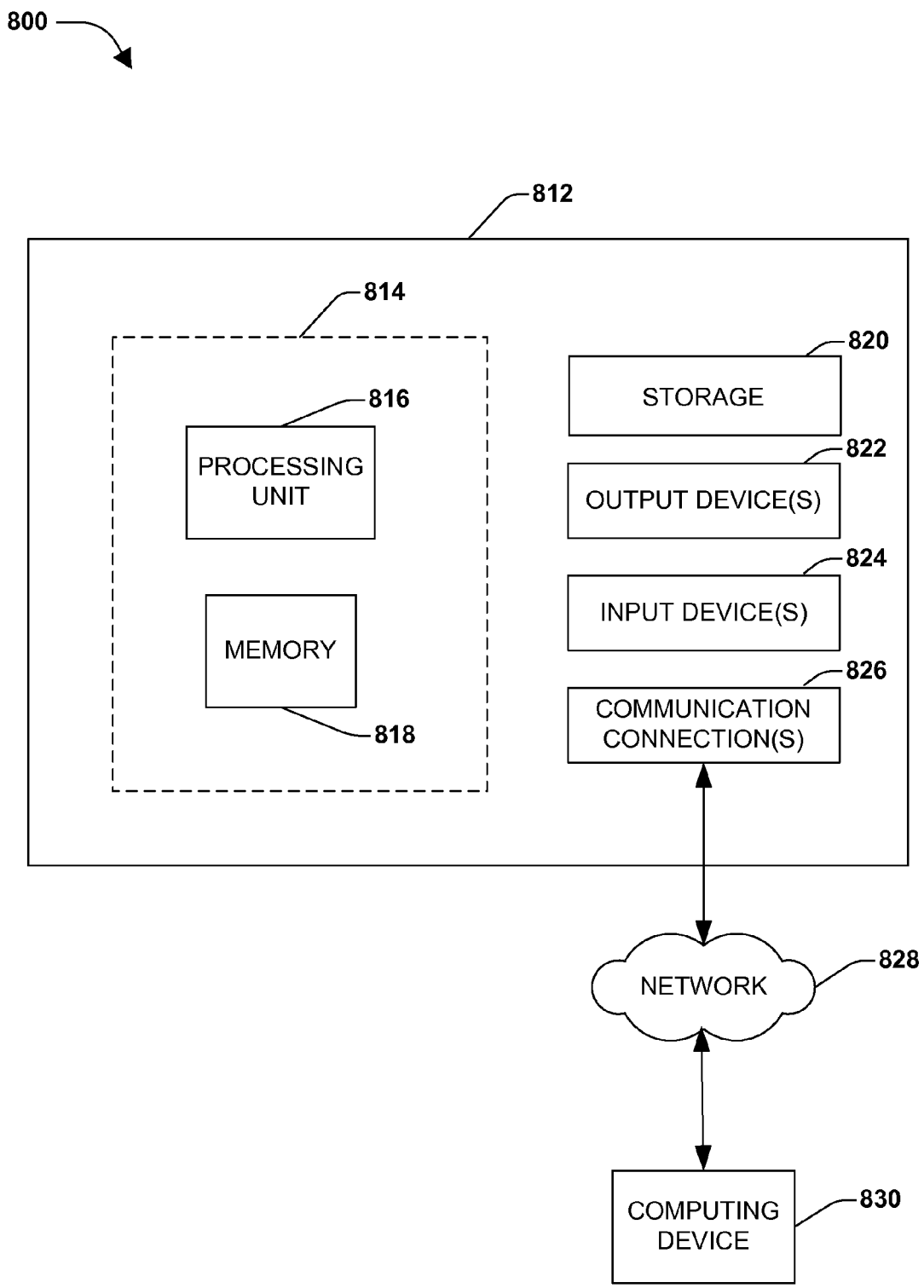
FIG. 8 is an illustration of an exemplary computer-readable medium comprising processor-executable instructions configured to embody one or more of the provisions set forth herein.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 810 comprising a computing device 812 configured to implement one or more embodiments provided herein. In one configuration, computing device 812 includes at least one processing unit 816 and memory 818. Depending on the exact configuration and type of computing device, memory 818 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In one embodiment, computer readable instructions to implement one or more embodiments provided herein may be in storage 820. Storage 820 may also store other computer readable instructions to implement an operating system, an application program, and the like. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Any such computer storage media may be part of device 812.

Device 812 may also include communication connection(s) 826 that allows device 812 to communicate with other devices. Communication connection(s) 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection(s) 826 may include a wired connection or a wireless connection. Communication connection(s) 826 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device(s) 824 such as keyboard, mouse, pen, voice input device, touch input device, infrared cameras, video input devices, and/or any other input device. Output device(s) 822 such as one or more displays, speakers, printers, and/or any other output device may also be included in device 812. Input device(s) 824 and output device(s) 822 may be connected to device 812 via a wired connection, wireless connection, or any combination thereof. In one embodiment, an input device or an output device from another computing device may be used as input device(s) 824 or output device(s) 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computer readable instructions may be distributed across a network. For example, a computing device 830 accessible via network 828 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method performed by at least one processing unit, the method comprising:
    identifying a seed lexicon term from a plurality of lexicon terms that are identified by a lexicon as members of a semantic class;
    identifying result documents retrieved from a search engine by queries submitted to the search engine that include the seed lexicon term;

extracting a keyword that is shared by the result documents retrieved from the search engine by the queries that include the seed lexicon term; and using the keyword shared by the result documents to expand the lexicon by:
identifying, in a query log, specific other result documents that also include the keyword shared by the result documents, wherein the query log does not indicate that the specific other result documents were retrieved from the search engine using the lexicon terms identified by the lexicon as members of the semantic class;
identifying another member of the semantic class in a particular query that has been submitted to the search engine to retrieve the specific other result documents; and
adding to the lexicon, as a new lexicon term, the another member of the semantic class.

2. The method of claim 1, further comprising:
cleaning contextual terms that appear in the particular query with the new lexicon term.

3. The method of claim 1, further comprising:
weighting the new lexicon term relative to another new lexicon term based at least on popularity of the new lexicon term and the another new lexicon term in a particular query domain associated with the semantic class, the weighting being based at least on counts of the new lexicon term with respect to the particular query domain.

4. The method of claim 1, wherein the keyword appears in both:
titles of the result documents retrieved from the search engine by the queries that include the seed lexicon term, and
other titles of the specific other result documents that the query log does not indicate were retrieved from the search engine using the lexicon terms identified by the lexicon as members of the semantic class.

5. The method of claim 1, wherein the keyword appears in both:
URLs of the result documents retrieved from the search engine by the queries that include the seed lexicon term, and
other URLs of the specific other result documents that the query log does not indicate were retrieved from the search engine using the lexicon terms identified by the lexicon as members of the semantic class.

6. The method of claim 1, wherein the keyword appears in both:
snippets of the result documents retrieved from the search engine by the queries that include the seed lexicon term, and
other snippets of the specific other result documents that the query log does not indicate were retrieved from the search engine using the lexicon terms identified by the lexicon as members of the semantic class.

7. The method of claim 1, further comprising:
parsing the particular query into one or more elements, the one or more elements including the another member of the semantic class.

8. A method performed by one or more processing units, the method comprising:
accessing a query log reflecting queries that users have submitted to a search engine to retrieve documents;
identifying, within the query log, first documents returned by the search engine in response to first queries that include a dictionary term that appears in a dictionary;
extracting a document pattern shared by the first documents; and
using the extracted document pattern to expand the dictionary by:
identifying second documents within the query log that also share the extracted document pattern shared by the first documents;
identifying a specific query term within the query log that the users submitted to the search engine to retrieve the second documents; and
expanding the dictionary by adding the specific query term to the dictionary as a new dictionary term.

9. The method of claim 8, wherein the dictionary comprises a lexicon of entities of a particular semantic class, the dictionary term and the new dictionary term being different entities of the particular semantic class.

10. The method of claim 9, wherein the particular semantic class is a restaurant class, the dictionary term identifies a first restaurant, and the new dictionary term identifies a second restaurant.

11. The method of claim 10, wherein the extracted document pattern shared by the first documents and the second documents includes the word "restaurant".

12. The method of claim 11, wherein the word "restaurant" appears in both:
first titles of the first documents, and
second titles of the second documents.

13. The method of claim 11, wherein the word "restaurant" appears in both:
first URLs of the first documents, and
second URLs of the second documents.

14. The method of claim 11, wherein the word "restaurant" appears in both:
first snippets of the first documents, and
second snippets of the second documents.

15. A system comprising:
one or more processing units; and
memory comprising instructions which, when executed by the one or more processing units, cause the one or more processing units to:
access a query log reflecting queries that users have submitted to a search engine to retrieve documents;
identify, in the query log, first documents that were returned by the search engine in response to users submitting lexicon terms to the search engine, the lexicon terms being identified by a lexicon as members of particular query domain;
extract a document pattern from the first documents that were returned by the search engine in response to the users submitting the lexicon terms to the search engine; and
use the extracted document pattern to expand the lexicon by:
identifying, in the query log, second documents that include the extracted document pattern and that the query log does not indicate were retrieved by submitting the lexicon terms to the search engine;
identifying, in the query log, another member of the particular query domain that the users have submitted to the search engine to retrieve the second documents; and
adding the another member of the particular query domain to the lexicon as a new lexicon term.

16. The system of claim 15, wherein the instructions, when executed by the one or more processing units, cause the one or more processing units to:

identify the new lexicon term by parsing a particular query that the users submitted to retrieve the second documents.

17. The system of claim 15, wherein the extracted document pattern comprises a specific word that is shared by both the first documents that were retrieved by submitting the lexicon terms to the search engine and the second documents that the query log does not indicate were retrieved by submitting the lexicon terms to the search engine.

18. The system of claim 17, wherein the instructions, when executed by the one or more processing units, cause the one or more processing units to:

weight the lexicon term relative to the new lexicon term based at least on relative popularity in the particular query domain.

19. The system of claim 17, wherein the particular query domain relates to locations, the lexicon term identifies a first location, and the new lexicon term that is added to the lexicon identifies a second location.

20. The system of claim 17, wherein the query domain relates to movies, the lexicon term identifies a first movie title, and the new lexicon term that is added to the lexicon identifies a second movie title.

21. A method performed by at least one processing unit, the method comprising:

obtaining a lexicon of previously-identified members of a semantic class;

processing a query log to identify result documents that have been retrieved using the previously-identified members of the semantic class;

identifying a characteristic that is shared by the result documents that have been retrieved using the previously-identified members of the semantic class;

identifying further result documents that also have the characteristic that is shared by the result documents that have been retrieved using the previously-identified members of the semantic class; and identifying a new member of the semantic class that has been used to retrieve the further result documents, the new member of the semantic class not being previously identified by the lexicon as belonging to the semantic class.

* * * * *